United States Patent
Suzumura et al.

(10) Patent No.: US 12,397,424 B2
(45) Date of Patent: Aug. 26, 2025

(54) METHOD AND APPARATUS FOR ONLINE TASK PLANNING AND ROBOT MOTION CONTROL

(71) Applicant: Omron Corporation, Kyoto (JP)

(72) Inventors: Akihiro Suzumura, San Ramon, CA (US); Gaurav Misra, San Ramon, CA (US); Andres Rodriguez Campo, San Ramon, CA (US); Kautilya Chenna, San Francisco, CA (US); Sean Bailey, San Ramon, CA (US); John Drinkard, San Ramon, CA (US)

(73) Assignee: OMRON CORPORATION, Kyoto (JP)

(*) Notice: Subject to any disclaimer, the term of this patent is extended or adjusted under 35 U.S.C. 154(b) by 228 days.

(21) Appl. No.: 18/317,128

(22) Filed: May 15, 2023

(65) Prior Publication Data

US 2024/0326245 A1   Oct. 3, 2024

Related U.S. Application Data

(60) Provisional application No. 63/456,441, filed on Mar. 31, 2023.

(51) Int. Cl.
   *B25J 9/16*   (2006.01)
(52) U.S. Cl.
   CPC .......... *B25J 9/1661* (2013.01); *B25J 9/1666* (2013.01); *B25J 9/1682* (2013.01)
(58) Field of Classification Search
   None
   See application file for complete search history.

(56) References Cited

U.S. PATENT DOCUMENTS

| 8,568,302 B2 | 10/2013 | Donhowe et al. |
| 8,924,021 B2 * | 12/2014 | Dariush ............... G06N 3/008 901/3 |

(Continued)

FOREIGN PATENT DOCUMENTS

| CN | 101612733 B | 7/2013 |
| CN | 103529856 A | 1/2014 |

(Continued)

OTHER PUBLICATIONS

Evan Drumwright et al., The Task Matrix: An Extensible Framework for Creating Versatile Humanoid Robots, May 2006, IEEE, p. 448-455 (Year: 2006).*

(Continued)

*Primary Examiner* — Thomas E Worden
*Assistant Examiner* — Atticus A Cameron
(74) *Attorney, Agent, or Firm* — Murphy, Bilak & Homiller, PLLC

(57) ABSTRACT

Disclosed techniques embody advantageous approaches to online task and motion planning for robots, based on the decomposition of robot tasks into subtasks having attached attributes that, among other things, indicate whether dynamic trajectory modification is permitted during subtask execution. The decomposition and attribute tagging allows for hybrid motion control during task execution, for example, with some subtasks allowing for reactive motion planning for collision avoidance, and other subtasks disallowing reactive motion. Collision avoidance for non-reactive subtasks involves, for example, coordinating volume reservations within an involved robot work cell, to prevent other robots from interfering with a robot engaged in a subtask designated as non-reactive. Determination of which subtasks are non-reactive relies on information included in (Continued)

an input task specification and may be based on user analysis or automated analysis of the involved robot application.

26 Claims, 10 Drawing Sheets

(56) References Cited

U.S. PATENT DOCUMENTS

| | | | |
|---|---|---|---|
| 9,411,330 | B2 | 8/2016 | Iuchi et al. |
| 9,592,604 | B2 | 3/2017 | Hoffman et al. |
| 9,915,937 | B2 | 3/2018 | Linnell et al. |
| 10,296,995 | B2 | 5/2019 | Saboo et al. |
| 10,745,003 | B2 | 8/2020 | Kentley-Klay et al. |
| 10,782,670 | B2 | 9/2020 | Crivella et al. |
| 2017/0139423 | A1 | 5/2017 | El Ferik et al. |
| 2020/0262065 | A1 | 8/2020 | Ghobadi et al. |
| 2020/0305984 | A1 | 10/2020 | Zhao et al. |
| 2021/0060778 | A1 | 3/2021 | Butterfoss et al. |
| 2021/0308862 | A1 | 10/2021 | Lin et al. |
| 2022/0226997 | A1 | 7/2022 | Takahashi et al. |
| 2022/0305646 | A1 | 9/2022 | Jain et al. |
| 2023/0082482 | A1 | 3/2023 | Satoh et al. |

FOREIGN PATENT DOCUMENTS

| | | | | |
|---|---|---|---|---|
| CN | 105824292 | A | | 8/2016 |
| CN | 103970139 | B | | 1/2017 |
| CN | 111191931 | A | * 5/2020 | ......... G06Q 10/0631 |
| CN | 111496774 | A | | 8/2020 |
| CN | 112706166 | A | | 4/2021 |
| CN | 111300420 | B | | 8/2021 |
| EP | 2485875 | B1 | | 4/2013 |
| JP | 2020040205 | A | | 3/2020 |
| WO | 2020083633 | A1 | | 4/2020 |

OTHER PUBLICATIONS

Anibal Coimbra de Matos et al., A Methodology for Replanning Collision Free Trajectories for a Mobile Robot, 1993, IEEE, p. 1454-1459 (Year: 1993).*
English machine translation of CN111191931A (Year: 2020).*

* cited by examiner

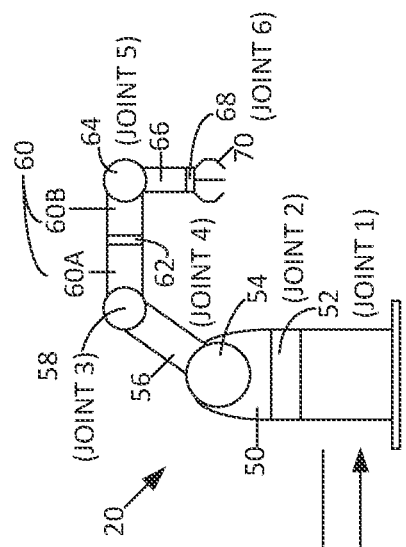
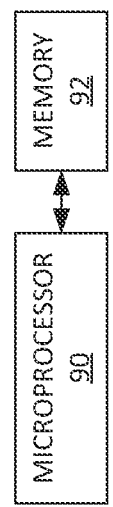
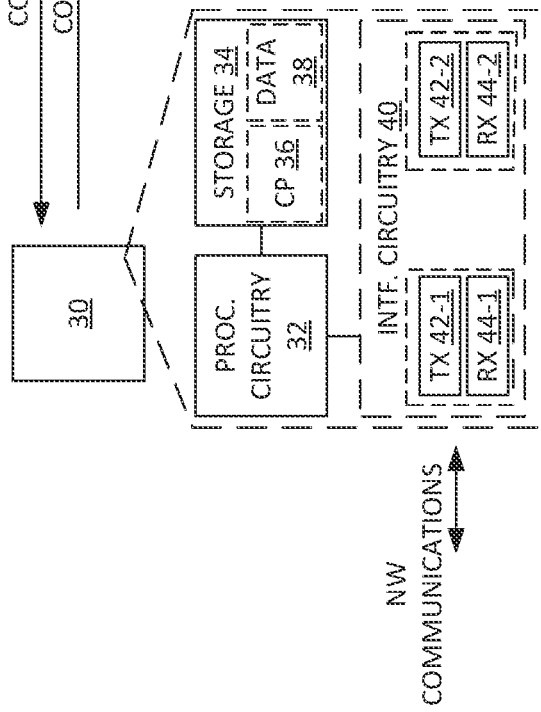
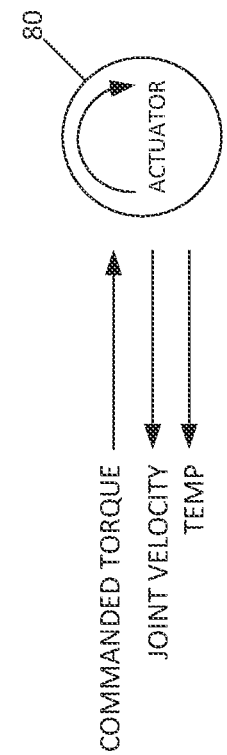
FIGURE 2
FIGURE 3
FIGURE 4

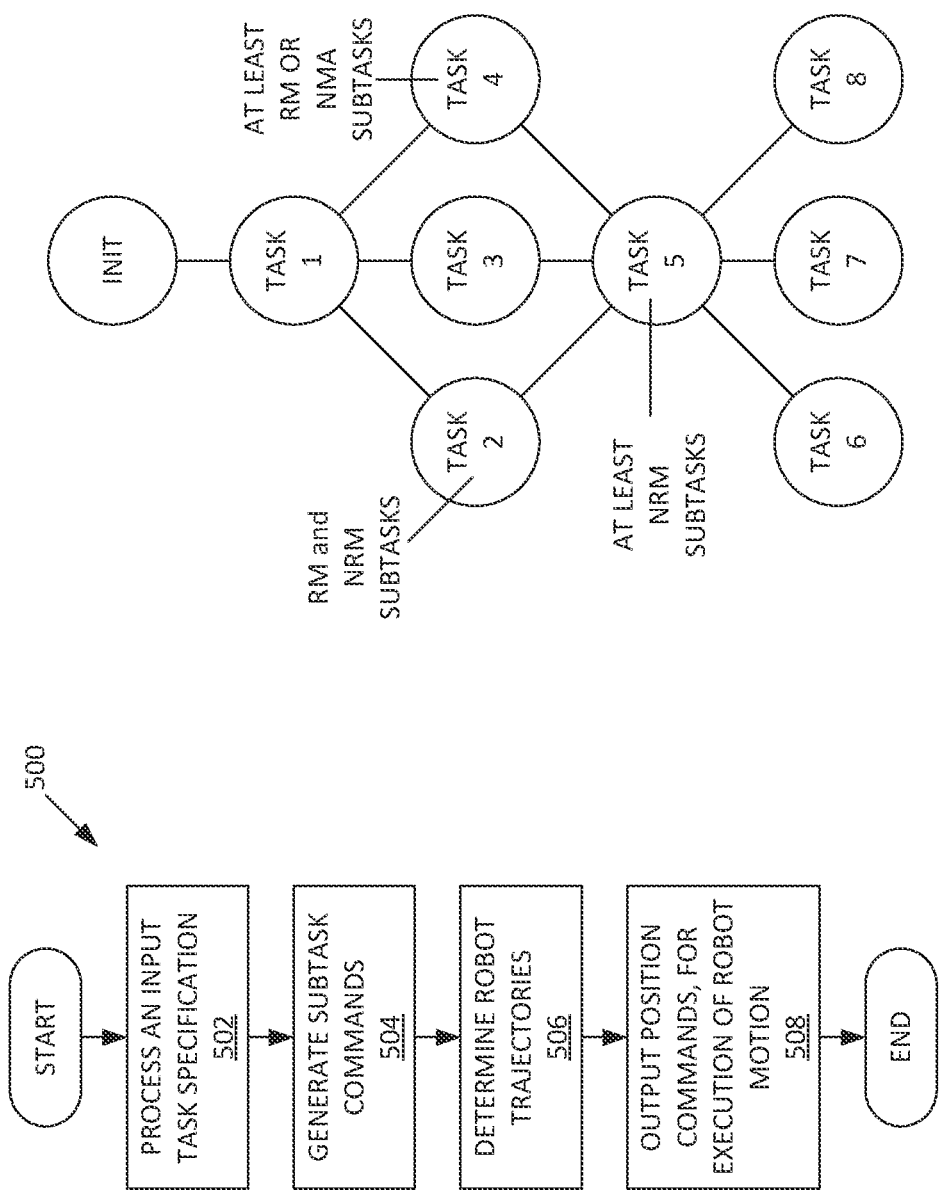

METHOD AND APPARATUS FOR ONLINE TASK PLANNING AND ROBOT MOTION CONTROL

TECHNICAL FIELD

Subject matter disclosed herein relates to robots and particularly relates to online task planning and robot motion control.

BACKGROUND

Robotic automation enables a wide variety of applications in industrial settings, such as assembly, welding, palletizing, deburring, and inspection. Realizing robotic automation requires planning and scheduling of robot tasks.

Generally, robotic automation applications are composed of one or more tasks, with example tasks being the pick and place of a part. Each task can encapsulate one or more subtasks, where an example subtask can be moving to a pre-pick location or moving from a pre-pick location to a pick location. Tasks and subtasks can have associated properties, objectives, and constraints that change during execution, such as path and/or velocity, and these can be specified or unspecified (flexible). For example, an industrial robot that is used for assembling machine parts is required to pick up the part, inspect the part, and then perform an action such as welding, deburring, or gluing of the part. Each of these tasks must be performed in a particular order and may involve multiple individual motions by robot actuators and motors.

Typically, a user manually specifies the task and the involved motion sequence of the robot, such that the robot completes the task while avoiding collisions with other objects or robots in the environment. While it may be possible to manually program robots offline, such approaches may not be suitable in some application contexts and may require arduous and tedious manual effort for setup, integration, and validation.

In particular, applications become especially challenging for manual set up when sources of variation are present. Sources of variations can include cycle to cycle variations in robot task sequence, start and goal locations, start timing, and duration. For example, in a deburring application, a part may arrive inconsistently in terms of timing and location on a conveyor belt, or the part size and shape may change from cycle to cycle. In addition, potential inspection steps before deburring can result in task sequence branching, such as where a piece may or may not be discarded after inspection. There may be potentially hundreds or even thousands of such variations in an application, making manual task assignment and trajectory programming extremely cumbersome and prone to errors.

Furthermore, many applications require multiple robots. For multiple robots operating in shared workspaces, task assignment and motion programming efforts become even more complicated. For example, the user needs to ensure collision avoidance between the robots and other objects in the environment manually, such as by using interlocking techniques. The creation, validation, and verification of such manual techniques becomes prohibitively difficult and expensive to implement.

The complexity and challenges of task planning and motion planning as described above drives increasing interest in and use of automatic online task planning and robot motion control. In this context, "task planning" can be understood as the process of combining and sequencing elementary robot operations into a structured plan to satisfy a prescribed goal, given specifications on the robot and the environment. These elementary robot operations can be further broken down into one or more discrete robot motions.

Execution of the task plan involves precise and accurate control of the motion of the robot, which means controlling the position, velocity, and acceleration of the robot, to ensure that it follows planned trajectories accurately. Such motion control accounts for various factors such as the dynamics of the robot, the state of its environment, and any obstacles that the robot may encounter during the execution of the task. Thus, online motion planning may be understood as the process generating discrete robot motions immediately before the start of (or during) a motion, that satisfy motion constraints and possibly optimize some aspect of the motion. Often these discrete robot motions result from a decomposition of a desired elementary robot operation. For example: a motion from a pre-pick to a pick location.

Online task and motion planning offer flexibility for handling sources of variation and providing automatic collision avoidance in a multi-robot context. In particular, some conventional approaches to automatic online task and motion planning use reactive motion control, which makes it possible for a robot to react, in real-time, to changes or variations in the environment. "Reactive" motion planning thus provides for real-time adjustments of robot trajectories, in response to obstacles, itself, other robots, or other environmental considerations.

Despite the benefits that existing online motion planning approaches provide to robotic automation, there are applications for which the existing approaches to online task and motion planning have limited utility or are completely incompatible. Unsuitability arises, for example, where certain subtasks in an application have incompatible objectives, constraints, or properties, thus making it infeasible to use online motion planning. For example, consider a subtask that requires the robot to follow a strict linear path with a specified speed for functional success, such as required for applying fluids like glue beads.

In such a subtask, any dynamic trajectory modification from a reactive motion planner to ensure collision avoidance would likely lead to application failure. Thus, there exists a dissonance due to competing functional and operational objectives such as collision avoidance and task/application success. Similar issues arise in a wide variety of practical robot applications and multi-robot contexts may be especially challenging.

SUMMARY

Techniques described in this specification allow for one or more tasks or subtasks to be assigned (dynamically or pre-assigned) to one or more robots in a multi-robot application for functionality and/or performance. Some embodiments allow for two or more subtasks to be bundled such that these bundled subtasks are executed without interruption.

Disclosed techniques embody advantageous approaches to online task and motion planning for robots, based on the decomposition of robot tasks into subtasks having attached attributes that, among other things, indicate whether dynamic trajectory modification is permitted during subtask execution. The decomposition and attribute tagging allows for hybrid motion control during task execution, for example, with some subtasks allowing for reactive motion planning for collision avoidance, and other subtasks disallowing reactive motion. Collision avoidance for non-reactive subtasks involves, for example, coordinating volume reservations within an involved robot work cell, to prevent other robots from interfering with a robot engaged in a subtask designated as non-reactive. Determination of which subtasks are non-reactive relies on information included in an input task specification and may be based on user analysis or automated analysis of the involved robot application.

One embodiment comprises a method of online task planning and robot motion control, for robot control. The method includes: (a) processing an input task specification that specifies robot tasks, wherein the input task specification decomposes robot tasks into subtasks and differentiates reactive-motion (RM) subtasks for which dynamic trajectory modification is permitted from non-reactive motion (NRM) subtasks for which dynamic trajectory modification is not permitted; (b) generating subtask commands sequentially according to subtask dependencies determined from the input task specification, wherein the subtask commands are distinguished between RM subtasks and NRM subtasks; (c) determining robot trajectories for performing the subtask commands, according to online motion planning that allows dynamic trajectory modification during the performance of RM subtasks, and does not allow dynamic trajectory modification during the performance of NRM subtasks; and (d) outputting position commands to one or more robot controllers, for execution of robot motion.

A related embodiment comprises a computer system for online task planning and robot motion control. The computer system includes interface circuitry and processing circuitry. The processing circuitry is configured to: (a) process an input task specification that specifies robot tasks, wherein the input task specification decomposes robot tasks into subtasks and differentiates reactive-motion (RM) subtasks for which dynamic trajectory modification is permitted from non-reactive motion (NRM) subtasks for which dynamic trajectory modification is not permitted; (b) generate subtask commands sequentially according to subtask dependencies determined from the input task specification, wherein the subtask commands are distinguished between RM subtasks and NRM subtasks; (c) determine robot trajectories for performing the subtask commands, according to online motion planning that allows dynamic trajectory modification during the performance of RM subtasks, and does not allow dynamic trajectory modification during the performance of NRM subtasks; and (d) output position commands to one or more robot controllers, for execution of robot motion.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIG. 2 is a block diagram of a computer system implementing the online task planning and motion control framework of FIG. 1, according to one embodiment, with the diagram further illustrating an example robot under control.

FIG. 3 is a block diagram of an example actuator of a robot, such as may be commanded during robot control.

FIG. 4 is a block diagram of example details for implementing the processing circuitry of the computer system shown in FIG. 2.

FIG. 5 is a logic flow diagram of a method of operation, for online task planning and motion control, according to an example embodiment.

FIG. 6 is a diagram of an of an example task graph, embodying a set of tasks included in a robot application.

DETAILED DESCRIPTION

Embodiments disclosed herein provide a holistic framework that enables achievement of the functional objectives embodied in a robot application, while also achieving operational objectives like collision avoidance for single and multi-robot work cells. The holistic framework allows for the incorporation of a diversity of motion planning techniques for the performance of a robot application, including allowing for both manual techniques and automatic motion planning techniques, such as reactive motion planning. Allowing for different types of motion planning at the subtask level enables sophisticated and automated accommodation of application-specific and motion-specific constraints in a wide range of practical applications involving single robots or multiple robots operating in a multi-robot work cell.

In this context, a "task" is a goal-oriented, functional block of a larger application. e.g. a place operation in a robotic assembly. A "subtask" is the fundamental building block of a larger application. One or more sub-tasks can be combined to form a task, e.g. a discrete robot motion from a pre-location to a place location (within a place task).

Figure 1:
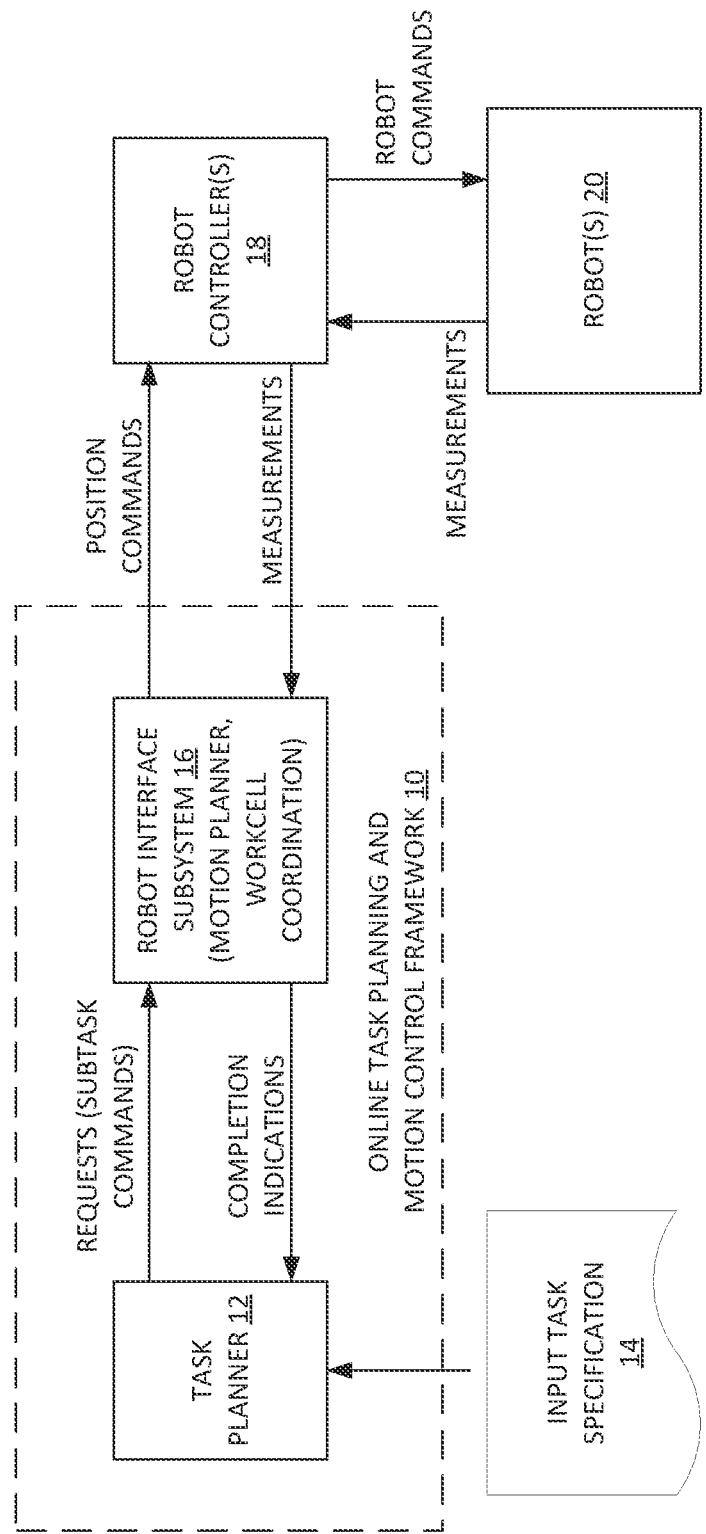
FIG. 1 is a block diagram of an online task planning and motion control framework, according to one embodiment.

FIG. 1 illustrates an example online task planning and motion control framework 10 ("framework 10" or "system 10"), wherein the motion control is based on online motion planning. The framework 10 relies on physical processing circuitry, memory, and interface circuitry for instantiation, although the framework 10 may be implemented in a virtualized computing environment based on underlying computing hardware.

The control framework includes an online task planner 12 that receives an input task specification 14, such as based on reading a data file from a computer file system, and further includes a robot interface subsystem 16, which includes a motion planner and, in one or more embodiments aimed at multi-robot environments, a work cell coordination function. The robot interface subsystem 16 translates the subtasks commands into corresponding position commands output to one or more robot controllers 18, with the position commands based on online motion planning. While shown as separate from the framework 10, the one or more robot controllers 18 may be integrated into the framework 10, e.g., an overall computer-system arrangement may include processing circuitry and associated interfaces, for instantiating the framework 10 and the robot controller(s) 18 as an integrated system.

Each robot controller 18 translates the position commands it receives into corresponding robot commands, which can be understood as commands to motors or other forms of actuators that move the involved robot linkages according to the commanded positions. There may be a robot controller 18 per robot 20, or one robot controller 18 may interface with and control more than one robot 20.

The illustrated operations may be performed on an ongoing basis, such as with the task planner 12 issuing subtask commands in sequence, the robot interface subsystem 16 issuing corresponding position commands, and the robot controller(s) 18 issuing corresponding robot commands to animate and otherwise control the one or more involved robot(s) 20. For example, in conjunction with or in addition to issuing commands the cause the robot(s) 20 to move, there may be commands that control end-effector or other control actions, e.g., for gripping objects or releasing them, or for controlling attached tools.

FIG. 2 illustrates a computer system 30 according to an example embodiment, wherein the computer system implements the framework 10 and the robot controller(s) 18 introduced in FIG. 1. An example embodiment of a robot 20 also appears in FIG. 2 and, according to the flexibility described above, the reader should appreciate that FIG. 2 represents only one example arrangement. For example, there may be more than one robot 20, with a robot controller 18 per robot 20. Further, the robot controller(s) 18 may be implemented apart from the framework 10, and the computer system 30 shown in FIG. 2 would communicate with the external robot controller(s) 18, and they would in turn issue the robot commands going to the robot(s) 20.

The computer system 30 includes processing circuitry 32, which may include or be communicatively coupled with storage 34. In one or more embodiments, the storage 34 stores one or more computer programs 36 ("CP" in the diagram), along with one or more types of data 38. In at least one embodiment, the stored data 38 includes a task specification 14 read by the computer system 30 and/or results of processing the task specification 14.

Interface circuitry 40 of the computer system 30 provides communicative coupling of the processing circuitry 32 with one or more external entities, systems, or devices. For example, the interface circuitry 40 includes first transceiver circuitry—shown as a transmitter (TX) 42-1 and a receiver (RX) 44-1—for interfacing with a Local Area Network (LAN) or other data network. A non-limiting example is implementation of the TX 42-1 and RX 44-1 as Ethernet-based interface circuitry. Of course, such circuitry may be radio circuitry for wireless communications, as an alternative or addition to wired connectivity.

The illustrated interface circuitry 40 further includes second transceiver circuitry—shown as a transmitter (TX) 42-2 and a receiver (RX) 44-2—for interfacing with robot(s) 20 directly or for interface with corresponding robot controllers 18. Note, too, that in some embodiments, a single communications interface, e.g., such as a data network interface, communicatively couples the computer system 30 for receiving task specifications 14, and for controlling robots 20 or interacting with their associated robot controller(s) 18.

Thus, the interface circuitry 40 may comprise digital or analog signaling circuitry or both, for outputting control commands to a robot controller 18 or a robot 20, and receiving corresponding feedback (corresponding measurements), such as used for responsive, dynamic control of the robot(s) 20. While the computer system 30 is shown separate from the example robot 20, it is robot-integrated in one or more other embodiments.

FIG. 2 also illustrates example details for one robot embodiment, and, again, there may be more than one robot 20 at issue, such as two or more robots 20 in a shared work cell. Multi-robot scenarios may involve two or more instances of the same type of robot or may involve instances of different types of robots.

The example arrangement illustrated for the robot 20 in FIG. 2 includes a base 50 that has a first axis of rotation via a first revolute joint 52. A second revolute joint 54 connects a first arm 56 to the base 50. The other end of the first arm 56 terminates in a third revolute joint 58, which couples the first arm 56 to a second arm 60, which is divided into two segments 60A and 60B, with a fourth revolute joint 62 allowing the segment 60B to rotate relative to the segment 60A. A fifth revolute joint 64 couples the segment 60B to a third arm 66, and a sixth revolute joint 68 couples an end effector 70 to the terminal end of the third arm 66.

Referring back to FIG. 1, subtask commands are translated into position commands, and position commands are translated into robot commands, which comprise, for example, control signals for the actuators of the involved robot(s) 20. More particularly, a generated subtask command results in one or more position commands, in the case that the involved subtask is a motion subtask, while a generated subtask command for a non-motion subtask generally does not result in the generation of a position command, but may involve generation of an action command—e.g., open gripper, close gripper, etc.

FIG. 3 illustrates example signaling between a robot controller 18 and an actuator 80 associated with a given joint of a given robot 20. The actuator 80 comprises a Direct Current (DC) rotary actuator, for example, but the robotic in one or more embodiments may include linear actuators or a mix of linear and rotary actuators. In any case, the example actuator 80 responds to incoming commands that control, for example, the direction of joint actuation, the actuation speed, and the extent of actuation. For rotary motion, such commands drive changes in joint angle, and controlling joint angles across/between the respective links of the robot 20 determines the pose of the robot 20, where "pose" refers to the specific position and orientation of all links of the robot 20.

Actuation of robots 20 occurs in relation to execution of one or more "applications," for example. An application may be embodied as a computer program, for example, and defines certain motions and end-effector operations to be performed by the robot(s) 20, to perform one or more tasks. Example tasks include pick-and-place tasks, where a robot 20 picks up an item from one location and places it in another location. In one example application, a robot 20 retrieves items from a conveyor and sequentially packs them on a pallet, in a box, or the like. The tasks described in an input task specification 14 may be understood as defining an application.

Correspondingly, the processing circuitry 32 of the computer system 30 is configured to process input task lists 14, and, as described above, generate corresponding subtask commands that are translated into motion and action commands for one or more robots 20. In an example implementation as shown in FIG. 4, the processing circuitry 32 may be realized as a microprocessor 90 executing computer program instructions held in an associated memory 92. In other words, the microprocessor 90 is specially adapted to operate according to the processing-circuitry descriptions provided herein, based on executing computer program instructions.

More generally, the processing circuitry 32 may be realized as fixed circuitry, programmatically configured circuitry, or a mix of both. Moreover, rather than a single microprocessor, two or more microprocessors may be used, or a multi-core microprocessor may be used. Additionally, or alternatively, implementation of the processing circuitry 32 may be based on essentially any type of digital processing circuitry, such as one more Field Programmable Gate Arrays (FPGAs), System-on-Chip (SoC), Application Specific Integrated Circuits (ASICs), Complex Programmable Logic Devices (CPLDs), or Digital Signal Processors (DSPs).

The storage 34 may comprise one or more types of computer-readable media, including volatile memory as working memory for program execution and related data storage, and non-volatile memory for longer-term storage of computer programs and configuration data, such as one or more user-configured parameter values. Examples, include Dynamic Random Access Memory (DRAM), Static RAM (SRAM), Non-volatile RAM (NV-RAM), FLASH or Solid State Disk (SSD), Electrically Erasable Programmable Read-only Memory (EEPROM), etc.

Regardless of specific implementation details, the computer system 30 is configured for online task planning and corresponding robot motion control and, in an example embodiment comprises interface circuitry 40 that is configured for receiving data comprising an input task specification 14 that specifies robot tasks, and further comprises processing circuitry 32.

The processing circuitry 32 is configured to process the input task specification 14, which specifies robot tasks. Particularly, the input task specification decomposes robot tasks into subtasks and differentiates reactive-motion (RM) subtasks for which dynamic trajectory modification is permitted from non-reactive motion (NRM) subtasks for which dynamic trajectory modification is not permitted.

The processing circuitry 32 is further configured to: generate subtask commands sequentially according to subtask dependencies determined from the input task specification 14, wherein the subtask commands are distinguished between RM subtasks and NRM subtasks; determine robot trajectories for performing the subtask commands, according to online motion planning that allows dynamic trajectory modification during the performance of RM subtasks, and does not allow dynamic trajectory modification during the performance of NRM subtasks; and output, via the interface circuitry 40, position commands to one or more robot controllers 18, for execution of robot motion.

The subtask commands are distinguished between RM subtasks and NRM subtasks via the inclusion of subtask attributes. Each subtask listed in the input task specification 14 belongs to a corresponding subtask category, where there are multiple subtask categories recognized by the computer system 30. Recognized categories include one or more categories of non-motion subtasks and two or more categories of motion subtasks, including the RM and NRM categories. Correspondingly, each subtask command includes an attribute indicating the corresponding subtask category for consideration in the online motion planning.

In at least one embodiment, an idle category is defined. Idle is a special category of motion subtasks, specifically a reactive motion subtask. The idle subtask requires the robot to maintain a desired pose for a given duration except when it needs to react to avoid collisions (which involves robot motion), with the property that the robot will go back to the desired pose once reactive avoidance is complete.

Category definitions may also include one or more non-motion action (NMA) categories for which dynamic trajectory modification is not permitted. The processing circuitry 32 is configured to output action commands to the one or more robot controllers 18, corresponding to NMA tasks represented in the subtask commands. As an example, NMA tasks can involve robot end-effector actions, and the action commands are end-effector control commands, such as grip, release, etc.

In at least one embodiment, in addition to the RM and NRM categories, the two or more motion categories include a predictive motion category where motion of a robot 20 is planned repeatedly over a prescribed time horizon, and a manual-mode motion category where motion of a robot 20 is defined manually according to a number of waypoints, with trajectory along the waypoints being generated using interpolation algorithms.

In one or more embodiments, an online motion planner instantiated via the computer system 30 uses the attributes for motion subtasks, to determine corresponding trajectory constraints. Determining constraints includes determining at a subtask granularity as to whether dynamic trajectory modification is or is not permitted. Among the several advantages embodied in the operation of the computer system 30 is the ability to have both reactive and non-reactive motion, with the decision made at the subtask level such that given tasks may be performed using a mix of reactive and non-reactive motion. This mix maximizes path planning flexibility while still allowing for non-reactive motion at times where deviations from the nominal or required trajectory are incompatible with performance of the involved subtasks.

The input task specification 14 relates to two or more robots operating in a shared workspace, in at least one embodiment. With respect to a given one of the robots 20 performing RM subtasks, the online motion planning includes dynamic trajectory modification for avoiding collisions with respect to the remaining one or more robots 20. With respect to a given robot 20 performing NRM subtasks, the processing circuitry 32 is configured to perform collision avoidance via coordinated volume reservations, such that the remaining one or more robots 20 do not perform interfering robot trajectories during execution of NRM subtasks by the given robot 20.

In the same or another example where the input task specification 14 relates to two or more robots operating in a shared workspace, the processing circuitry 32 is configured to identify related tasks that must be performed by a same one among the two or more robots 20 and assign subtasks comprising the related tasks to the same robot 20.

In at least one embodiment, the processing circuitry 32 is configured to recognize and handle "subtask bundles." That is, the input task specification 14 may indicate one or more subtask bundles. Each subtask bundle contains two or more subtasks of a corresponding task that must be performed by a robot 20 to which the corresponding task is assigned without interruption by other robots 20. Here, the processing circuitry 32 is configured to coordinate operations between two or more robots 20, to provide for uninterrupted execution of each subtask bundle.

In at least one embodiment involving subtask bundles, one or more tasks or subtasks are pre-assigned for performance by a specific robot 20 among two or more robots 20 cooperatively sharing a workspace, and one or more tasks or subtasks listed in the input task specification 14 are unassigned. With respect to unassigned tasks or subtasks, the processing circuitry 32 is configured to determine robot assignments. Assignments may be done at the task level, and assignments may be determined based on availability, load balancing, the state(s) of the robots 20 that are candidates for selection, or other considerations.

FIG. 5 illustrates a method 500 of operation by a computer system, such as the computer system 30 described above, for online task planning and robot motion control. The method 500 includes processing (Block 502) an input task specification 14 that specifies robot tasks. Such processing includes, for example, reading the input task specification 14 as a stored computer file, or receiving signaling indicating the input task specification 14. In any case, the input task specification 14 decomposes robot tasks into subtasks and differentiates reactive-motion (RM) subtasks for which dynamic trajectory modification is permitted from non-reactive motion (NRM) subtasks for which dynamic trajectory modification is not permitted.

The method 500 further includes generating (Block 504) subtask commands sequentially according to subtask dependencies determined from the input task specification. The subtask commands are distinguished between RM subtasks and NRM subtasks, and the method 500 further includes determining (Block 506) robot trajectories for performing the subtask commands, according to online motion planning that allows dynamic trajectory modification during the performance of RM subtasks and does not allow dynamic trajectory modification during the performance of NRM subtasks. Still further, the method 500 includes outputting (Block 508) position commands to one or more robot controllers 18, for execution of robot motion. The method 500 may further include any of the additional or alternative operations described above for processing circuitry 32, for implementation of the framework 10.

FIG. 6 illustrates an example task graph representing a single or multi-robot application. The task graph illustrates the application as comprising a plurality of tasks, with the interconnections between tasks indicating task dependencies, e.g., Task 1 must be performed before Task 2, and so on. A key aspect of the task graph is that it represents a practical, real-world application in which performance of the overall application requires both reactive motion and non-reactive motion. Merely as an example, Task 2 comprises a set of subtasks, some involving subtasks of the RM category and subtasks of the NRM category. Task 4 contains subtasks of at least the RM or NMA category, and Task 5 includes at least NRM subtasks.

Unlike conventional online task and motion planning, the framework 10 described herein allows subtask-level granularity for controlling whether reactive motion (dynamic trajectory modification allowed) or non-reactive motion (dynamic trajectory modification not allowed) is used. This level of granularity provides increased flexibility for dynamic collision avoidance during at least some portion of motion, while still allowing deterministic path following for those motions for which dynamic path modification is not appropriate.

A disclosed approach links attributes to subtasks, with the attribute linked to each subtask the subtask category and with involved motion planner being configured to recognize which subtask categories allow reactive motion and which do not. Of course, additional information may be specified in the input task specification 14, such as properties and/or constraints attached at the task or subtask level. Also as noted, the input task specification 14 may indicate subtask bundles. Here, bundling is a particular way of constraining tasks/subtasks. The framework 10 recognizes tasks/subtask designations and controls runtime, for automatic assignment of tasks/subtask bundles to one or more specific robots 20, with subtask generation and sequencing and overall control orchestration ensuring that subtask bundles are executed in sequence and without interruption or overriding.

Viewed another way, decomposition of the application tasks into subtasks and the recognition and use of attributes at the subtask level makes it possible to impose task-specific constraints and objectives on an online motion planner in an ad-hoc manner, where this type of advantageous control can be generalized to any application, including those with multiple robots and those with essentially any sources of variation. Here, "ad-hoc" refers to the seamless changing of motion control from reactive to non-reactive or vice versa at the subtask-level of granularity.

Returning again to FIG. 1, the framework 10 may be understood as a robot motion control system that includes several functional components. including an online execution system comprised of at least the task planner 12 and the robot interface subsystem 16. These components may be implemented via the execution of one or more computer programs—e.g., the computer program(s) 36 shown in FIG. 2—via one or more computer systems, such as the computer system 30. If multiple computer systems are involved, they may be configured to communicate via a network such as Ethernet, EtherCAT, or Firewire. The robot interface subsystem 16 may also include a programmable logic controller (PLC), for implementation of the robot controller(s) 18 shown in FIG. 1.

The task planner 12 provides a set of subtask commands sequentially, to be executed by the robot interface subsystem 16, which in turn sends the commanded positions to the robot controller(s) 18 that drives the one or more multi-axis robots 20 being controlled.

The robot interface subsystem 16 includes a global path planner that generates a feasible collision-free path for the one or more robots 20, based on the inputs from the task planner 12, which can include a start and goal configuration, the desired path with speed constraints, and multiple subgoals. The robot interface subsystem 16 also includes a local optimization-based reactive planner that takes as input the feasible, collision-free path and generates a time-parameterized, collision-free trajectory that is sent to the corresponding robot controller(s) 18 for execution. The robot interface subsystem 16 also include supporting modules that enable motion coordination between multiple robots to resolve situations involving goal conflicts and deadlocks. Here, a supporting module can be understood as a logical function realized via the execution of computer program instructions.

As shown in FIG. 2, a robot 20 may be a multi-axis robotic arm having an end-effector at the end of the arm. The arm includes a plurality of joints, and the end-effector can include a two-finger gripper, vacuum suction. a gluing device as examples. The position of the robot is defined by the angles of each joint of the robot. A given position and orientation of the robot can correspond to one or more joint configurations of the robot. During execution, the robot interface subsystem 16 sends command positions to the involved robot controller 18 and receives corresponding measured positions in return.

In one embodiment, prior to the execution operations carried out by the system referred to as the online task planning and motion planning framework, a user provides an input task specification 14 that encompasses an entire application to be performed by a particular robot 20 or by any one or more among multiple robots 20. The task specification 14 identifies a sequence of tasks, with one or more of the tasks encapsulating subtasks. It could simply be one subtask encompassed within a task, but typically a task encompasses a plurality of subtasks in an ordered sequence that produces an intermediate result, such as a pick operation, after which the next operation, such as a place operation, may or may not be determinately selected. There may be tasks by a plurality of allowed robots within a sequence. A task is treated herein as a goal-oriented, functional building block of a larger application, such as robotic assembly.

The task specification 14 may be provided as a structured text document, such as an XML or as a logic flowchart. The task planner 12 processes the task specification 14 to build a corresponding directed graph. Information conveyed in the task specification 14 includes task parameterizations, where task parameters indicate: the dependency of completion of any other task in the list; the number and a unique identifier (ID) of the robot(s) that are allowed that to perform the task; identification of subtasks as being bundled or unbundled; and the indication of subtask decompositions per task.

The directed graph maintains the order of tasks to be performed and honors task dependencies. In the directed graph illustrated in FIG. 6, Task 5 depends on the completion of Task 2, 3, and 4. This dependency constrains the task planner 12 from sending a request for Task 5, or any subtask thereof, to the robot interface subsystem 16 until Tasks 2, 3, and 4 are complete. It is possible to define multiple dependencies, depending on the application constraints. The graph is traversed over by using the breadth-first search to find the next task of the robot(s) 20.

Multiple robots 20 may be allowed to perform a task, which may be identified by the robot number and ID information included in the task specification 14. Correspondingly, the robot interface subsystem 16 automatically assigns the task to one robot and handles priorities. Tasks can have any number of task dependencies and the task planner 12 restricts execution of a current task unless all its dependent tasks have been completed successfully. Completion information may be provided to the task planner 12 as feedback from the robot interface subsystem 16. In addition, within a specified task, the subtasks can be bundled. On the other hand, a task may additionally or alternatively include unbundled subtasks. In at least one embodiment, the robot interface subsystem 16 is configured to switch the unbundled subtasks for a particular robot 20 on an automatic basis, to manage coordination with other robots 20.

In one or more embodiments, subtasks are characterized into multiple categories. based on subtask properties and associated constraints, which may be specified as part of the task specification 14. Example properties that a subtask may have include: (1) reactivity, where the robot motion plan may change during execution to react and avoid other dynamic objects; (2) duration, where a particular subtask must be completed in the specified duration; (3) kinematic limits, where a particular subtask must obey given bounds on the joint motion, including position, velocity, acceleration and jerk or a range of robot tool center point orientation; and (4) tool, where a particular subtask may be associated with a particular end-effector tool and this tool may change from one subtask to other.

Figure 7:
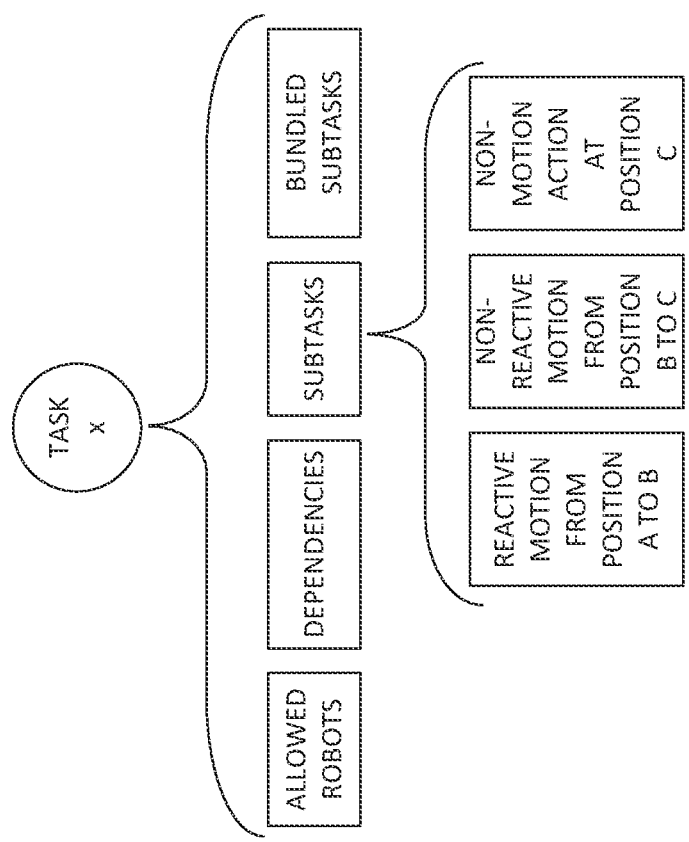
FIG. 7 is a diagram of an example parameterization of an individual task, including subtask decompositions and corresponding subtask categorizations.

The proposed task specification 14 allows for a range of subtasks to be specified with given properties. An example subtask framework appears in FIG. 7, for a given task "x" specified in a task specification 14.

As for example subtask categories that may be specified in a task specification 14 and advantageously recognized and acted on by the framework 10, a first example category is reactive motion. With reactive motion, a robot 20 moves from one position to another position—e.g., from a start position to a goal position—and the robot interface system automatically re-plans trajectories to avoid collisions with other objects or robots 20 in the environment. Subtasks that belong to the reactive-motion (RM) category have an attribute indicating the RM category, and the corresponding subtasks commands may specify start joint configurations and goal joint configurations.

The framework 10 in one or more embodiments also allows the specifications of start and goal positions of the end-effector position and orientation. This category of motion may be realized but is not limited to, trajectory optimization or artificial potential fields.

A second example category of subtasks is non-reactive motion (NRM). For NRM subtasks, a robot 20 moves from a start position to a given goal position on a pre-defined path and/or velocity and does so without reacting to other objects or robots in the environment. The robot interface subsystem 16 in at least one embodiment automatically handles collision avoidance by first assigning priority to the robot 20 undergoing the non-reactive motion, computing the volume swept by the body of the robot 20 during the non-reactive motion and reserving this volume, such that no other object or robot can enter it until the robot 20 completes the non-reactive motion. The volume reservation may be referred to as a coordinated volume reservation because it involves coordinating the control of more than one robot 20.

End effector "actions" can be broken into two categories, based on the volume reservation required: 1) actions that do not require a change in the volume reservation, which would be classified as a NMA (non-motion action); or 2) actions that do require a change in the volume reservation, which would be classified as a NRM (non-reactive motion).

Here, "representation" is the shape that is used to represent the object, e.g. for collision avoidance purposes, and "reservation" is the volume protected against intrusion (and this is based on the representation and the volume swept during a motion). Typically the distinction depends on: a) the size of the end effector volume reservation (e.g. "tight" or "oversized"), and b) the amount of motion associated with the end effector action (e.g. no/trivial motion vs large motions). For example, consider:

Case A: a vacuum gripper which does not move on actuation and therefore does not require a change in the required end effector volume reservation does not change; hence, actions involving the vacuum griper are in the NMA category;

Case B: a small-motion two-fingered gripper having an "oversized" end effector volume reservation, meaning that, although the gripper fingers move, they remain within the oversized volume reservation; hence actions involving the fingered gripper are in the NMA category; and Case C: a large-motion two-fingered gripper having a "tight" end effector volume reservation, meaning that as the gripper fingers move they exceed the original "tight" end effector volume reservation; hence actions involving the fingered gripper are in the NRM category.

These considerations are particularly important because it is not uncommon for robots to have complex, large-motion end effectors, and the techniques herein account for all such cases. Finally, this is also the case for any workpiece being held by an end effector—whether all three are covered by the arm volume reservation, the combination of arm and end effector volume reservations, or the combination of arm, end effector, and workpiece volume reservations—the volume reservation (however formulated) must cover all three of arm, end effector, and workpiece (if present). Overall, this approach is driven by the mindset that the end effector (and workpiece, if present) are not distinct from the robot arm, at least for the purposes of task and motion planning for things like collision avoidance.

Figure 8:
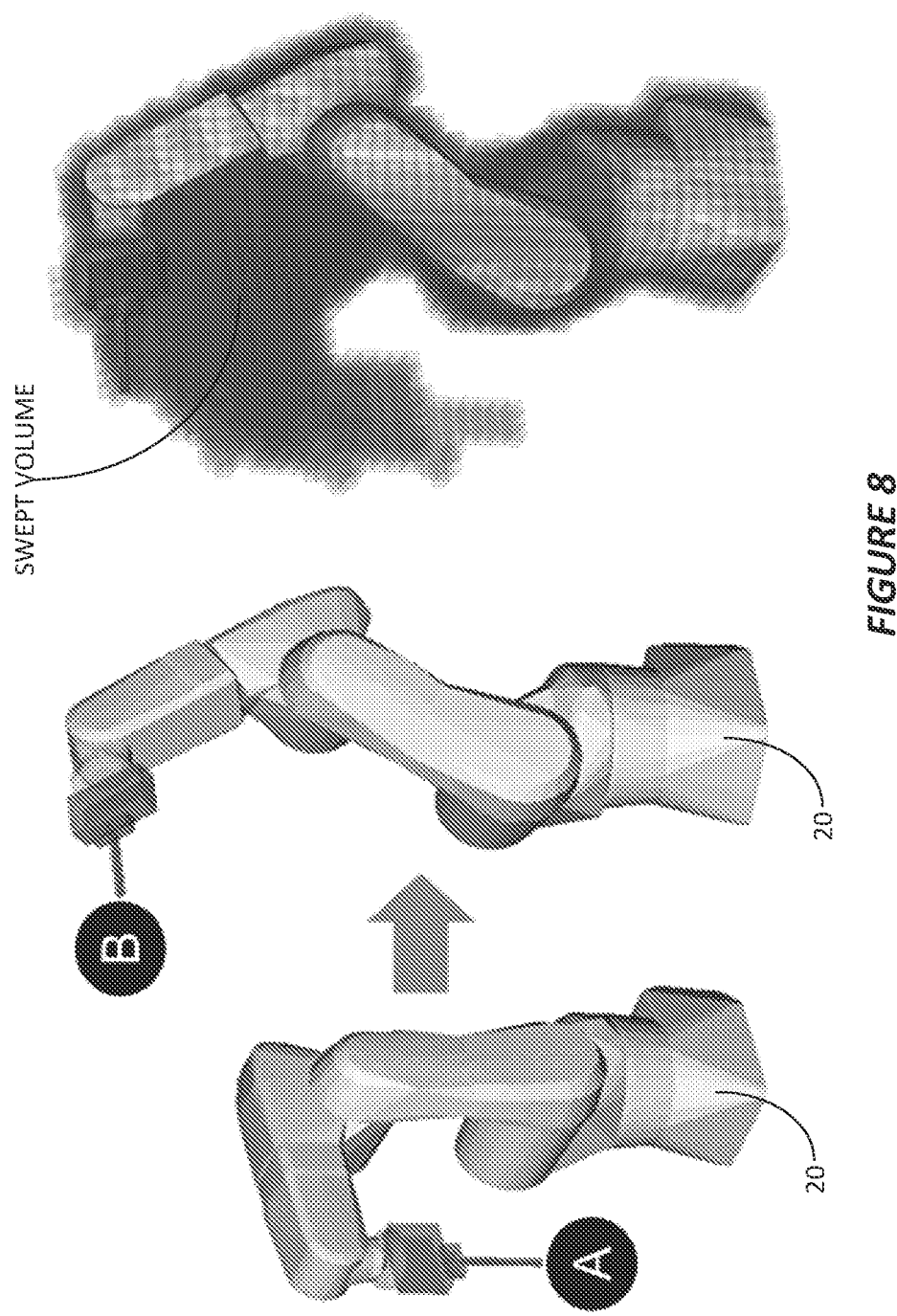
FIG. 8 is a diagram illustrating volume reservation between a start position A and a goal position B.

FIG. 8 illustrates a given robot 20 that moves from a position A to a position B via non-reactive motion. The motion causes the robot 20 to sweep a certain volume, which is calculated and reserved via coordinated volume reservations by the robot interface subsystem 16. In an embodiment, where the robot interface subsystem 16 issues all position commands for all involved robots 20, rather than just a particular one of the involved robots 20, the coordination may be understood as internal coordination of when positions commands are issued and to which robot(s) they are issued. In other embodiments, where one or more of the involved robots 20 respond to position commands issued by another entity, the coordination involves the robot interface subsystem 16 communicating with those other entities.

Subtasks of the NRM category are specified with an attribute, e.g., an ID, that indicates the NRM category. Each NRM subtask may also specify a start joint configuration, and a goal joint configuration. Alternatively, a non-linear (e.g., circular) path may be specified. It is also possible to specify a speed constraint along such path.

Another example subtask category is the non-motion action (NMA) category. For a NMA subtask, the body of the robot 20 does not move, but the end-effector may execute some action such as opening or closing. NMA subtasks are specified with an ID indicating the NMA category, and each NMA subtask may also specific a time duration for end-effector gripping, holding, or releasing operations. In at least one embodiment, the robot interface subsystem 16 automatically handles collision avoidance for the performance of NMA subtasks, for example, by computing the volume swept by the robot during a NMA subtask, including the motion of the end-effector, and reserving the swept volume such that no other object or robot 20 enters it until the robot 20 completes the NMA subtask.

A further subtask category is an idle category, which is a special category of motion subtasks. During execution of an idle subtask, the robot remains stationary but reactive at a given position. Idle subtasks are parameterized based on a specified time duration—i.e., idle duration. Idle subtasks allow a robot 20 to wait at a given location before or after beginning a task, due to application-specific timing constraints, but allow the robot 20 to be reactive, as needed, while waiting.

Still further, the defined categories of subtasks may include a predictive motion category. For a predictive motion subtask, the robot motion from a given start to goal is repetitively planned over a limited time horizon while estimating the motion of other dynamic objects in the environment. Compared to the RM category of subtasks, which have a limited time horizon of a single time-step, a subtask of the predictive motion category explicitly predicts and plans robot motion over a longer time horizon.

Because of the longer time horizon planning, it is possible to account for dynamic changes in the environment and ensure collision avoidance in uncertain environments. Predictive-motion subtasks are identified using a corresponding ID, and specify a start joint configuration and a goal joint configuration, and a planning time horizon. The framework 10 also allows specifications of start and goal positions of the end-effector position and orientation. This category of motion may be realized by model predictive control, but realization is not limited to that approach.

Another defined category of subtasks in at least one embodiment is a manual-mode motion category. For a manual-mode motion subtask, the robot motion is specified by the user based on a number of waypoints. These waypoints can be specified in Cartesian space or joint space. In this category, motion may be interpolated between the waypoints using a fitting technique such as splines, linear motion, or polynomials. This subtask category is specified with an ID indicating the MM (Manual-mode Motion) category, and each MM subtask specifies a start joint configuration and a goal joint configuration and can include multiple intermediate waypoints. It may also specify robot speeds at these intermediate waypoints and may additionally or alternatively specify start and goal positions of the end-effector position and orientation.

Thus, any given subtask listed in an input task specification 14 may be parameterized with an ID that indicates its subtask category and with additional information indicating any one or more of: start and goal configurations in joint space or Cartesian space, duration, end-effector operations, duration (only required if subtask is idle or to specify acquisition time for a gripper or the like), time horizon (required for predictive motion), intermediate waypoints provided in joint space or Cartesian space (for manual-mode motion), or robot speed at intermediate waypoints (for manual-mode motion).

Figure 9:
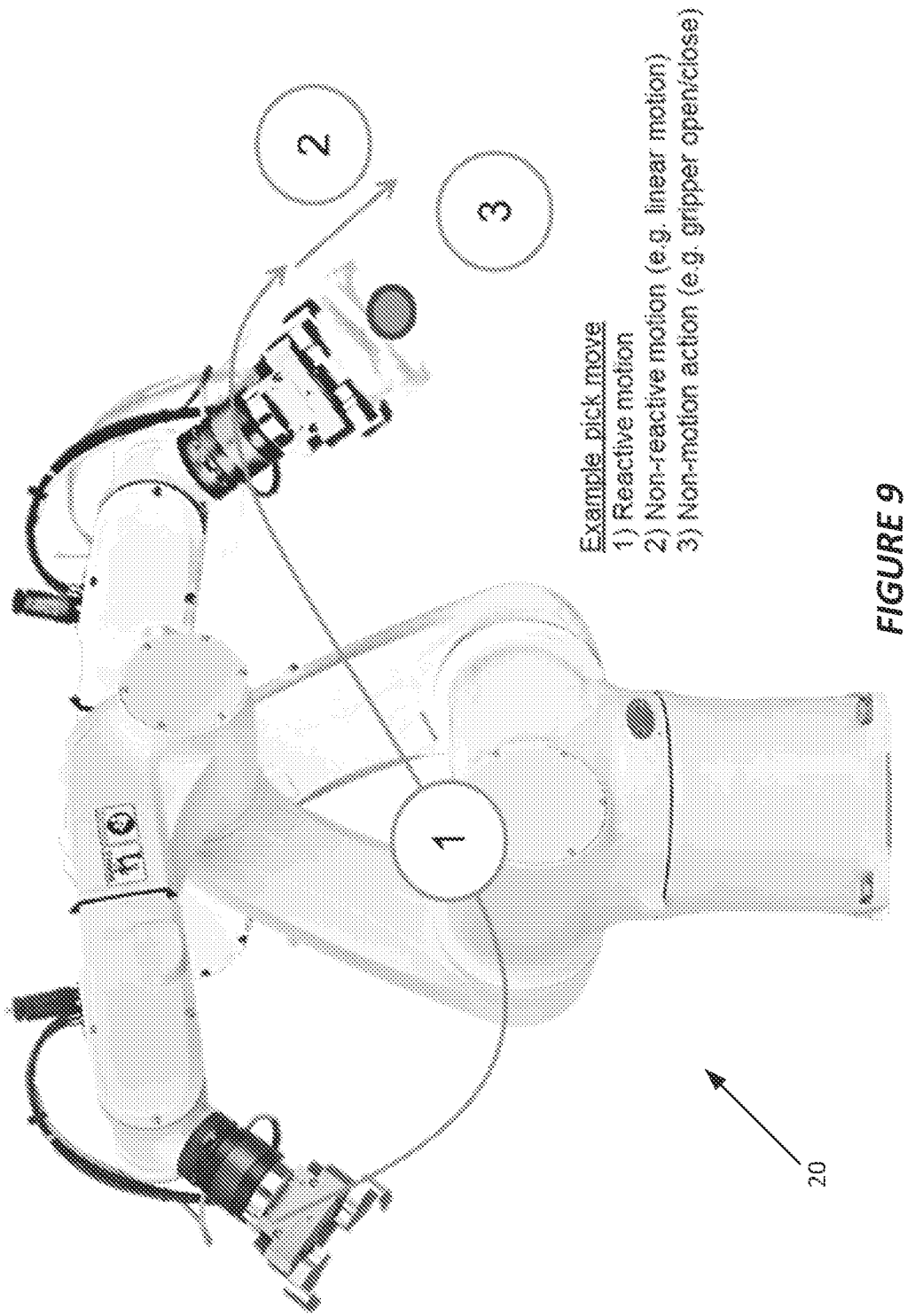
FIG. 9 is a diagram of an example robot, shown in different positions associated with different subtask categories for an example pick operation.

In a more detailed example of subtask bundling, consider a robot end-effector that must follow a linear path towards an object, with the robot then grasping the object, followed by the robot retracing the same linear path towards a given location. These three subtasks must be completed by the same robot, and the sequence of approaching the object, grasping, and departing with the grasped object must happen in that order without interference. An interference may happen if a second robot in the environment takes priority towards an overlapped goal region and causes the first robot to break its task sequence. FIG. 9 illustrates an example of such motion by a robot 20.

Figure 10:
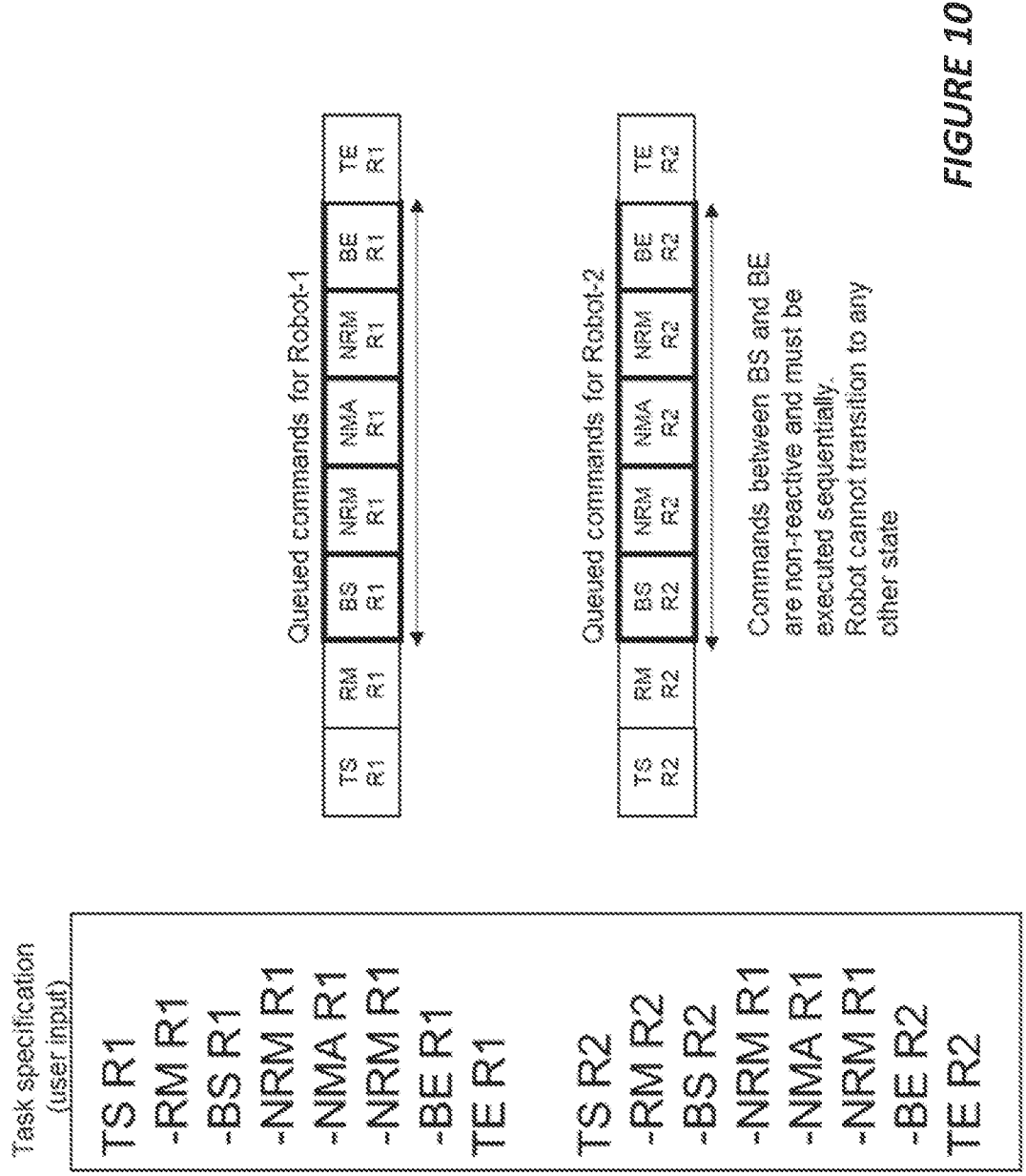
FIG. 10 is a diagram of an example task specification for an application that involves two robots, with example subtask decomposition and subtask bundling.

The type of inter-robot interference described immediately above may lead to application failure. To prevent such events from occurring, one or more embodiments of the disclosed framework allow for subtask bundling. FIG. 10 illustrates an example of how a user can prepare a task specification 14 that uses subtask bundling in the context of a two-robot-application. The different robots are denoted as robot R1 and robot R2.

The task specification includes RM, NRM, and NMA subtasks, as well as TS (Task Start), TE (Task End), BS (Bundle Start), and BE (Bundle End) commands. The task specification 14 specifies the correct task sequence and the task planner 12 recognizes the sequencing. Each command generated by the task planner 12 is added to an internal queue with a specified order.

The subtasks bundled with TS and TE are considered as a set of commands for the same task. This recognition of subtask bundling is used to determine the priority of R1 and R2. For example, if reactive motion by R1 conflicts with reactive motion of R2, such as where a goal location is overlapped, the reactive motion of R1 is prioritized, in this example. Of course, there may be other instances within the same overall application where prioritization of R2 is appropriate.

The commands bundled with BS and BE are considered as "sequential non-reactive motion." In this case, the framework 10 reserves the entire space occupied by the involved robot for execution of the bundled subtasks, to prevent other robots from interfering the pre-programmed non-reactive motion. The swept volume illustration as shown in FIG. 8 involve the robot moving from configuration A to B, with the shaded reserved region being represented in terms of the voxels occupied by the robot during motion.

Figure 11:
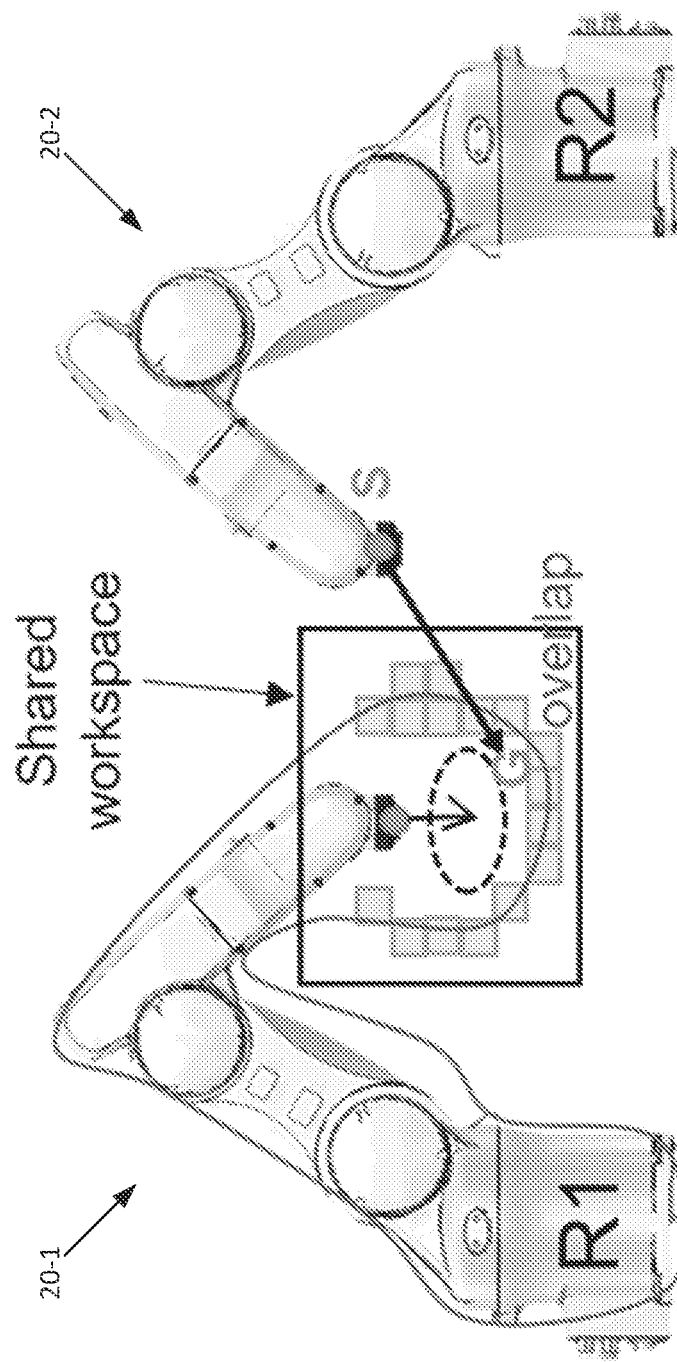
FIG. 11 is a diagram of two six-axis robots and illustrates an example scenario where the goal regions of both robots overlap.

FIG. 11 illustrates a scenario illustrating the need for coordinated volume reservation, with the example involving a first robot 20-1, denoted as R1, and a second robot 20-2, denoted as R2. The two robots R1 and R2 operate in a shared workspace where volume reservation is required. For example, volume is reserved for R1 around a designated goal. allowing R1 to execute NRM and NMA subtasks without interference from R2. As the task priority changes to R2, R1 must move to a safe, collision-free location, and volume will be reserved for R2 its goal, for execution of NRM and NMA subtasks. During the goal reservation and until R2 completes its bundled subtasks, no other robot is allowed to enter the volume reserved. As the process moves forward, the completed subtask commands are removed from the queue, and the framework 10 changes the active command to the next top-level command of the target robot 20. In this way, the framework 10 automatically handle all robots 20 without any conflict, given appropriately specified task/subtask information.

Figure 12:
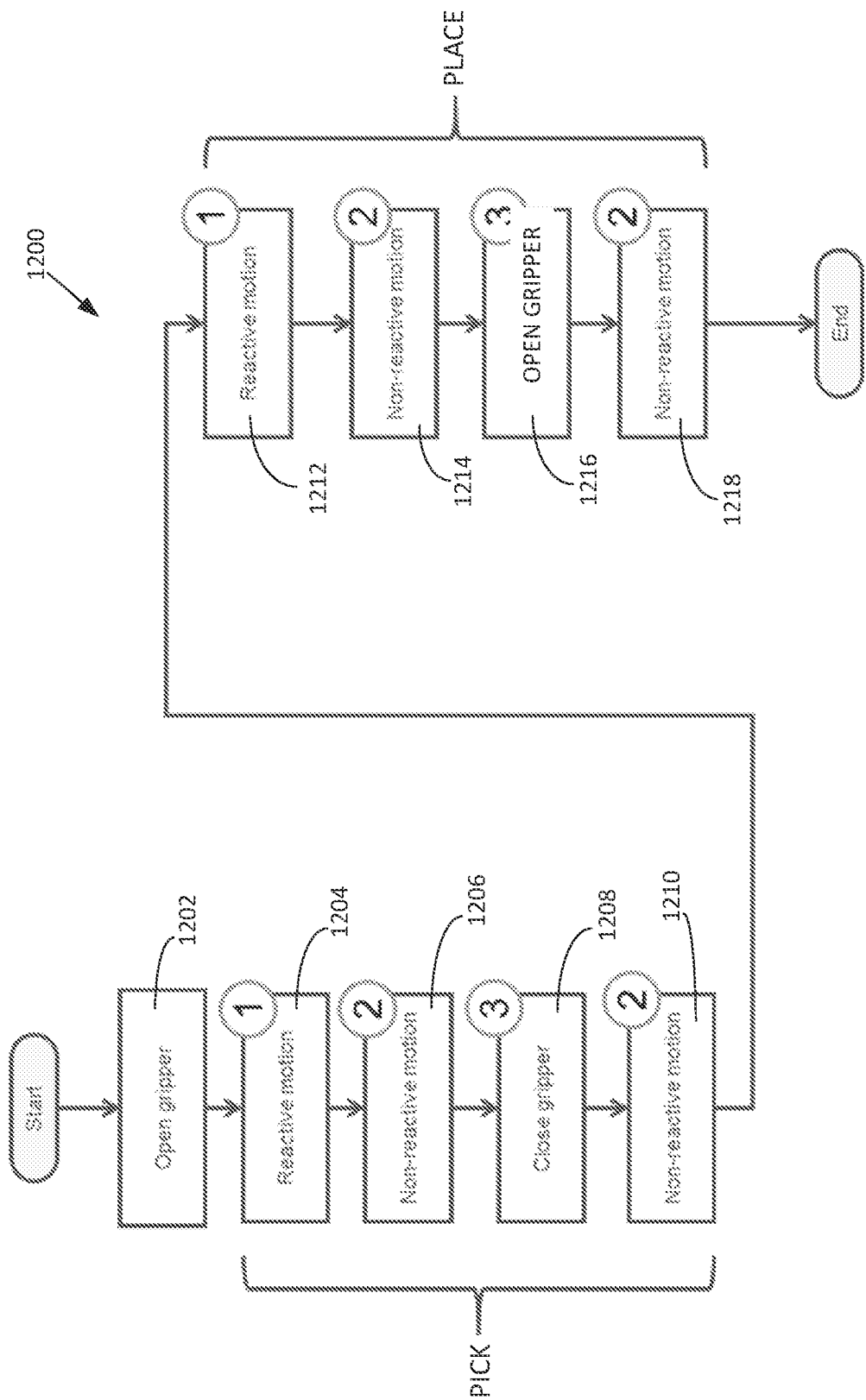
FIG. 12 is a logic flow diagram illustrating an example pick-and-place application, with corresponding subtask decompositions.

FIG. 12 illustrates an example application involving pick-and-place of an object by a robot 20. The flowchart 1200 divides the application into separate pick and place operations, wherein both pick and place are characterized by multiple distinct operations. The operation begins with opening a gripper of the robot 20, which is a NMA subtask (Block 1202). This operation is followed by a RM subtask (Block 1204), where the robot 20 reactively moves from a given start location to a desired goal location close to a grasp point, where the object is picked. The third operation is a NRM subtask (Block 1206), where the robot 20 is constrained to move along a given path with speed restrictions, to approach the grasp point at a certain orientation. This operation fundamentally cannot be reactive, as reactive motion could lead to collision with the workpiece or other objects in the environment, due to interference by other robots. The fourth operation is end-effector (e.g., a gripper) action (Block 1208), where the object is grasped, and the gripper is closed. Depending on whether a change in volume reservation is required, gripper actions may be performed as non-motion actions or non-reactive motion actions. After the gripper action, the robot 20 moves to the pre-grasp location by execution a NRM subtask (Block 1210), which movement concludes the pick operation.

The place operation then commences, starting with a RM subtask (Block 1212) during which the robot 20 moves towards the pre-grasp point, followed by a NRM subtask (1214) during which the robot 20 moves towards the part drop location. At the part release location, the robot executes an end-effector action (Block 1216) to release the part. These kinds of actions may be a non-motion subtask if no change in volume reservation is required for the action or may be a non-reactive motion action if a change in volume reservation is required for the action. After that, the robot 20 executes a NRM subtask (Block 1218), where it returns to the pre-grasp location.

Many industries require multi-axis robotics for dispensing operations. For example, in the automotive industry, multi-axis robots are used for dispensing a variety of materials. including adhesives, lubricants, and sealants. Window and door manufacturers also use multi-axis robots to apply adhesives and gaskets.

Figure 13:
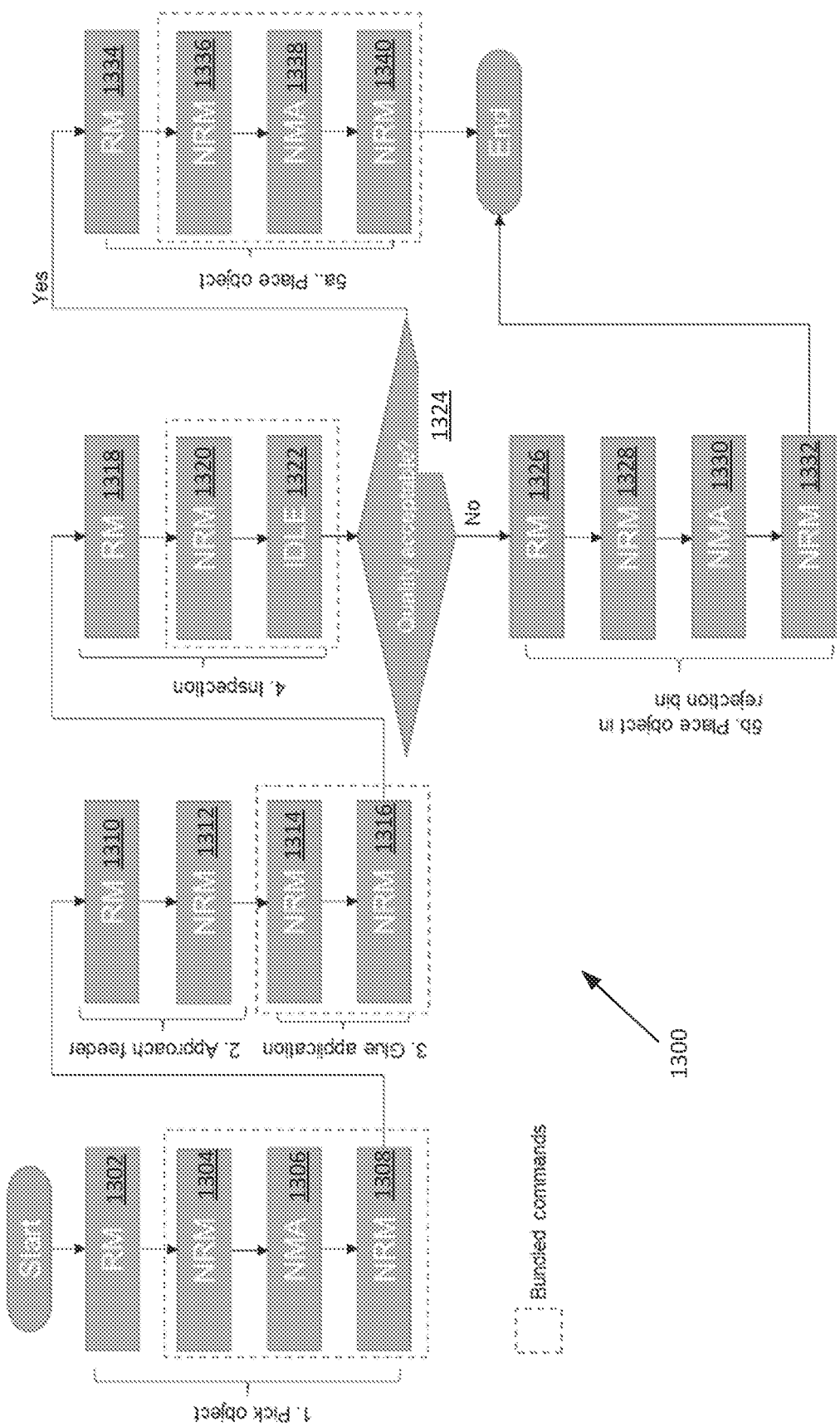
FIG. 13 is a logic flow diagram of an example glue bead application, with corresponding subtask decompositions.

An example glue bead application that uses advantageous task decomposition and bundling techniques is represented in the flowchart 1300 shown in FIG. 13. The application involves a multi-axis robotic manipulator, a dispenser that can be mounted at a fixed position, the workpiece part, an inspection area, and input/output conveyors where the workpiece part is picked and placed. The application is divided into sequential tasks, which are then decomposed into subtasks, with subtask categorization as described herein, and with subtask bundling. The application involves:

Task 1 (Pick): the robot moves from initial location to a defined pre-pick location, using a speed-constrained approach along a path to pick the part from a conveyor, followed by a departure along a constrained path at a constrained speed, back towards the pre-pick location. See Blocks 1302, 1304, 1306, and 1308 for the subtask categorizations.

Task 2 (Approach feeder): the robot with the grasped workpiece moves from the pre-pick location on top of the conveyor to a given location, followed by a path and speed constrained approach to the dispenser location. See Blocks 1310 and 1312 for the involved subtasks.

Task 3 (Gluing): the robot moves the workpiece with path and speed constraints such that the dispenser can apply a bead to the part. Note that typically this type of motion is parameterized in the Cartesian space. This task may consist of a plurality of non-reactive motions during glue bead dispensing. See Blocks 1314 and 1316 for the involved subtasks.

Task 4 (Inspection): the robot moves the finished part to an inspection area. See Blocks 1318, 1320, and 1322 for the involved subtasks.

Task 5a (Acceptance of Object): responsive to acceptable quality (YES from Block 1324), the robot moves from the inspection location to a placement location and releases the object and then returns to a designated location. See Blocks 1334, 1336, 1338, and 1340 for the involved subtasks.

Task 5b (Rejection of Object): responsive to unacceptable quality (NO from Block 1324) the robot moves the part from the inspection location to a rejection bin. See Blocks 1326, 1328, 1330, and 1332 for the involved subtasks.

With the above example details in mind, the disclosed subject matter embodies techniques for implementation of online task planning and robot motion control, even where the involved application requires instances of non-reactive motion by the robot(s), and while providing the flexibility of reactive motion in other instances. The techniques include decomposing a robotic application into tasks and subtasks, where subtasks decomposed from a task have associated properties, objectives, constraints, and attributes. Properties, for example, may change from one task to another. Example objectives include minimum time operations for given tasks, while constraint examples include task-dependent restrictions on path, and speed.

A particular aspect is the association of attributes with subtasks, where the attributes indicate subtask categories, and allow the online motion planner to perform motion control using different motion-control strategies in dependence on the subtask category. For example, RM subtasks are performed using dynamic trajectory modification, e.g., for collision avoidance, whereas NRM subtasks are performed without using dynamic trajectory modification, to maintain deterministic paths. Other categories include different non-motion categories that allow or disallow reactive behavior by the robot for different non-motion actions.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of online task planning and robot motion control, the method comprising:
    processing an input task specification that specifies robot tasks, wherein the input task specification decomposes robot tasks into subtasks and differentiates reactive-motion (RM) subtasks for which dynamic trajectory modification is permitted from non-reactive motion (NRM) subtasks for which dynamic trajectory modification is not permitted;
    generating subtask commands sequentially according to subtask dependencies determined from the input task specification, wherein the subtask commands are distinguished between RM subtasks and NRM subtasks;
    determining robot trajectories for performing the subtask commands, according to online motion planning that allows dynamic trajectory modification during the performance of RM subtasks, and does not allow dynamic trajectory modification during the performance of NRM subtasks; and
    outputting position commands to one or more robot controllers, for execution of robot motion.

2. The method according to claim 1, wherein the subtask commands are distinguished between RM subtasks and NRM subtasks via the inclusion of subtask attributes.

3. The method according to claim 1, wherein each subtask listed in the input task specification belongs to a corresponding subtask category, and wherein there are multiple subtask categories recognized by the processing, including one or more categories of non-motion subtasks and two or more categories of motion subtasks, including the RM and NRM categories, wherein each subtask command includes an attribute indicating the corresponding subtask category, for consideration in the online motion planning.

4. The method according to claim 3, wherein the two or more categories of motion subtasks include an idle category for which dynamic trajectory modification is permitted and the one or more categories of non-motion tasks include a non-motion action (NMA) category for which dynamic trajectory modification is not permitted.

5. The method according to claim 4, wherein the method includes outputting action commands to the one or more robot controllers, corresponding to NMA tasks represented in the subtask commands.

6. The method according to claim 5, wherein NMA tasks involve robot end-effector actions, and the action commands are end-effector control commands.

7. The method according to claim 3, wherein, in addition to the RM and NRM categories, the two or more motion categories include a predictive motion category where motion of the robot is planned repeatedly over a prescribed time horizon, and a manual-mode motion category where motion of the robot is defined manually according to a number of waypoints, with trajectory along the waypoints being generated using interpolation algorithms.

8. The method according to claim 3, wherein an online motion planner uses the attributes for motion subtasks, to determine corresponding trajectory constraints, including determining at a subtask granularity as to whether dynamic trajectory modification is or is not permitted.

9. The method according to claim 1, wherein the input task specification relates to two or more robots operating in a shared workspace and, with respect to a given one of the robots performing RM subtasks, the online motion planning includes dynamic trajectory modification for avoiding collisions with respect to the remaining one or more robots, and wherein with respect to the given robot performing NRM subtasks, collision avoidance is based on performing coordinated volume reservations, such that the remaining one or more robots do not perform interfering robot trajectories during execution of NRM subtasks by the given robot.

10. The method according to claim 1, wherein the input task specification relates to two or more robots operating in a shared workspace and wherein the method includes identifying related tasks that must be performed by a same one among the two or more robots and assigning subtasks comprising the related tasks to the same robot.

11. The method according to claim 10, wherein the input specification indicates one or more subtask bundles, each subtask bundle comprising two or more subtasks of a corresponding task that must be performed by a robot to which the corresponding task is assigned without interruption by the one or more other robots, and wherein the method further comprises coordinating operations of the two or more robots to provide for uninterrupted execution of each subtask bundle.

12. The method according to claim 1, wherein one or more tasks or subtasks are pre-assigned for performance by a specific robot among two or more robots cooperatively sharing a workspace, and wherein one or more tasks or subtasks are unassigned, and the method further includes determining robot assignments for the unassigned tasks or subtasks.

13. A computer system for online task planning and robot motion control, the computer system comprising:
    interface circuitry configured for receiving data comprising an input task specification that specifies robot tasks; and
    processing circuitry configured to:
    process the input task specification that specifies robot tasks, wherein the input task specification decomposes robot tasks into subtasks and differentiates reactive-motion (RM) subtasks for which dynamic trajectory modification is permitted from non-reactive motion (NRM) subtasks for which dynamic trajectory modification is not permitted;
    generate subtask commands sequentially according to subtask dependencies determined from the input task specification, wherein the subtask commands are distinguished between RM subtasks and NRM subtasks;
    determine robot trajectories for performing the subtask commands, according to online motion planning that allows dynamic trajectory modification during the performance of RM subtasks, and does not allow dynamic trajectory modification during the performance of NRM subtasks; and
    output, via the interface circuitry, position commands to one or more robot controllers, for execution of robot motion.

14. The computer system according to claim 13, wherein the subtask commands are distinguished between RM subtasks and NRM subtasks via the inclusion of subtask attributes.

15. The computer system according to claim 13, wherein each subtask listed in the input task specification belongs to a corresponding subtask category, and wherein there are multiple subtask categories recognized by the computer system, including one or more categories of non-motion subtasks and two or more categories of motion subtasks, including the RM and NRM categories, wherein each subtask command includes an attribute indicating the corresponding subtask category for consideration in the online motion planning.

16. The computer system according to claim 15, wherein the two or more categories of motion subtasks include an idle category for which dynamic trajectory modification is permitted, and wherein the one or more categories of non-motion subtasks includes a non-motion action (NMA) category for which dynamic trajectory modification is not permitted.

17. The computer system according to claim 16, wherein the processing circuitry is configured to output action commands to the one or more robot controllers, corresponding to NMA tasks represented in the subtask commands.

18. The computer system according to claim 17, wherein NMA tasks involve robot end-effector actions, and the action commands are end-effector control commands.

19. The computer system according to claim 15, wherein, in addition to the RM and NRM categories, the two or more motion categories include a predictive motion category where motion of the robot is planned repeatedly over a prescribed time horizon, and a manual-mode motion category where motion of the robot is defined manually according to a number of waypoints, with trajectory along the waypoints being generated using interpolation algorithms.

20. The computer system according to claim 15, wherein an online motion planner instantiated via the computer system uses the attributes for motion subtasks, to determine corresponding trajectory constraints, including determining at a subtask granularity as to whether dynamic trajectory modification is or is not permitted.

21. The computer system according to claim 13, wherein the input task specification relates to two or more robots operating in a shared workspace and, with respect to a given one of the robots performing RM subtasks, the online motion planning includes dynamic trajectory modification for avoiding collisions with respect to the remaining one or more robots, and wherein with respect to the given robot performing NRM subtasks, the processing circuitry is configured to perform collision avoidance via coordinated volume reservations, such that the remaining one or more robots do not perform interfering robot trajectories during execution of NRM subtasks by the given robot.

22. The computer system according to claim 13, wherein the input task specification relates to two or more robots operating in a shared workspace and wherein the processing circuitry is configured to identify related tasks that must be performed by a same one among the two or more robots and assign subtasks comprising the related tasks to the same robot.

23. The computer system according to claim 22, wherein the input specification indicates one or more subtask bundles, each subtask bundle comprising two or more subtasks of a corresponding task that must be performed by a robot to which the corresponding task is assigned without interruption by the one or more other robots, and wherein the processing circuitry is further configured to coordinate operations of the two or more robots to provide for uninterrupted execution of each subtask bundle.

24. The computer system according to claim 13, wherein one or more tasks or subtasks are pre-assigned for performance by a specific robot among two or more robots cooperatively sharing a workspace, and wherein one or more tasks or subtasks are unassigned, and, with respect to unassigned tasks or subtasks, the processing circuitry is further configured to determine robot assignments.

25. A method of online task planning and robot motion control, the method comprising:
 processing an input task specification that relates to two or more robots operating in a shared workspace, the input task specification indicating a number of tasks to be performed;
 identifying related tasks that must be performed by a same one among the two or more robots; and
 assigning subtasks comprising the related tasks to the same robot.

26. The method according to claim 25, wherein the input specification indicates one or more subtask bundles, each subtask bundle comprising two or more subtasks of a corresponding task that must be performed by a robot to which the corresponding task is assigned without interruption by the one or more other robots, and wherein the method further comprises coordinating operations of the two or more robots to provide for uninterrupted execution of each subtask bundle.

* * * * *